No. 616,073. Patented Dec. 20, 1898.
P. BRENNAN.
CRANK HANGER.
(Application filed Oct. 1, 1896.)
(No Model.)
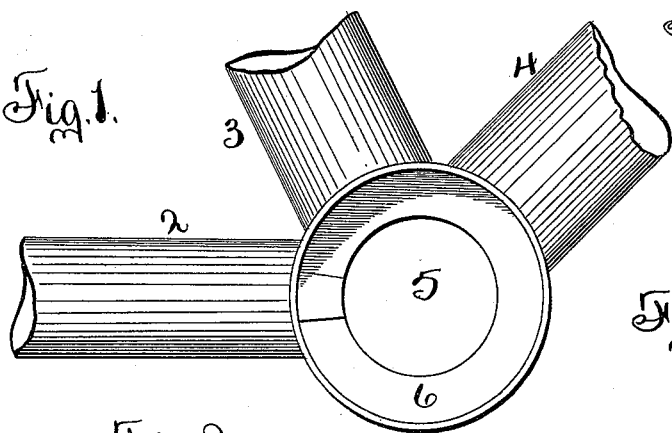
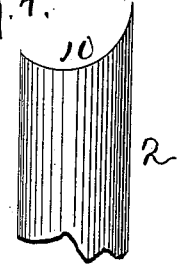
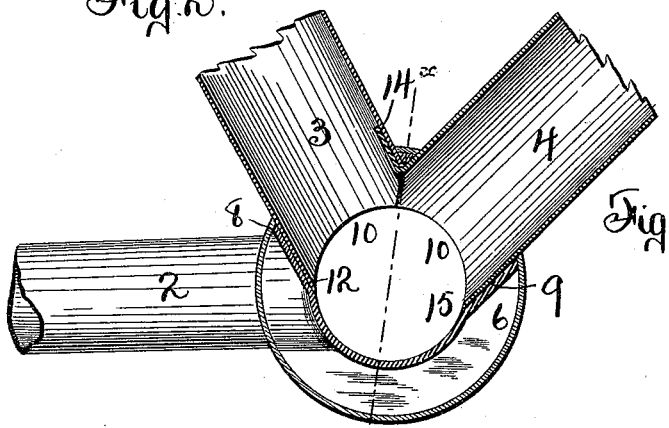
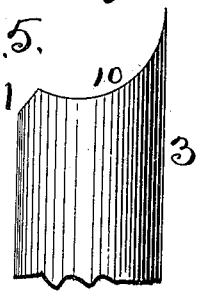
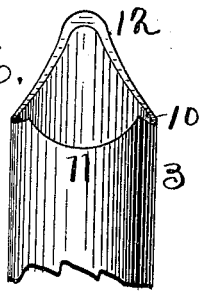
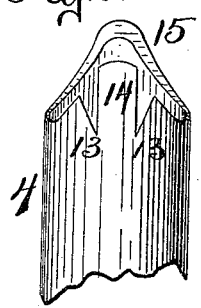
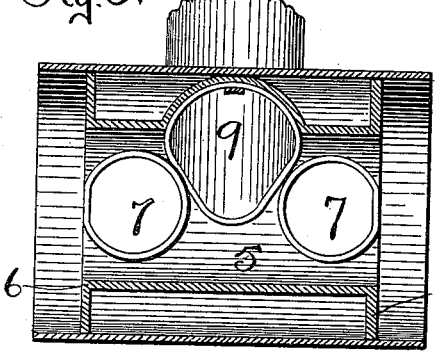
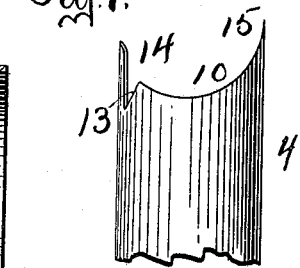
WITNESSES:
Charles M. Marvin
Mary A. Franklin
INVENTOR
Patrick Brennan.
BY
Smith & Kenison
ATTORNEYS.
THE NORRIS PETERS CO., PHOTO-LITHO., WASHINGTON, D. C.

UNITED STATES PATENT OFFICE.

PATRICK BRENNAN, OF SYRACUSE, NEW YORK.

CRANK-HANGER.

SPECIFICATION forming part of Letters Patent No. 616,073, dated December 20, 1898.

Application filed October 1, 1896. Serial No. 607,519. (No model.)

*To all whom it may concern:*

Be it known that I, PATRICK BRENNAN, of Syracuse, in the county of Onondaga, in the State of New York, have invented new and useful Improvements in Crank-Hangers, of which the following, taken in connection with the accompanying drawings, is a full, clear, and exact description.

My invention relates to cycles, and particularly to that class in which the members of the frame are connected and secured together by invisible or exteriorly-flush joints.

My object is to join, unite, connect, or secure together the members of a cycle-frame by invisible or exteriorly-flush joints and by interlocking part, at least, of the members in addition to the usual brazing.

To that end, in a crank-hanger connection, it comprises a casing, a barrel within it having a body parallel with but separated from the casing, provided with exteriorly-projecting flanges upon the ends, fitting closely into the casing, and also having projections or perforations through the body provided with exteriorly-projecting flanges, creating sockets to receive the frame members, said sockets having their outer ends cut off or formed concentric with the axis of said barrel and fitting closely against the inner wall of said casing. Then the tubes are inserted through the casing into the sockets, their inner ends being scarfed in a suitable manner. The inner surface of each socket or projection forms the brazing-surface. Then the brazing material is applied around each tube in the angle of its intersection with the exterior of the casing, and the heat is applied directly to said material to melt it and flow it into the joint, and the casing and tube are only moderately heated, much less than when the brazing material is loaded into the tube and melted therein by heat applied to the exterior of said tube. Also the one tube is provided with a tongue which is bent or hooked over into another tube to interlock therewith and increase the strength of the joint additional to the brazing to stand the longitudinal strain. The flanged ends of the barrel form abutments against which the ball-caps bear inwardly and by which they are held in place.

It is constructed as follows, reference being had to the accompanying drawings, in which—

Figure 1 is an end elevation of a crank-hanger, having the saddle-post, front reach-section, and rear reach-forks connected thereto by invisible or flush joints. Fig. 2 is a vertical section thereof. Fig. 3 is a vertical section on the dotted line in Fig. 2. Fig. 4 is a side elevation of the inner end of a reach-fork bar. Fig. 5 is a like view of the inner end of the saddle-post. Fig. 6 is a front elevation of the same. Fig. 7 is a side elevation of the inner end of the front reach-bar. Fig. 8 is a top plan of the same.

A suitable casing is provided with suitable holes to receive the inner ends of the several members of a cycle-frame, which meet at the crank-hanger and are secured thereto, 2 being a reach-fork bar, 3 a saddle-post, and 4 a front reach-bar.

A barrel 5 fits closely within the casing, separated or spaced away therefrom by the outward flanges 6 upon its ends, which fit closely within the casing, and by the outer ends of the tubular sockets 7 8 9, projecting from the barrel and having their outer ends rounded, so as to fit against the inner wall of the casing, and being of proper size to receive the frame members aforesaid, there being two sockets 7, one for each of the fork-bars.

The inner end of each frame-bar is scarfed off upon the arc of the radius of the circle of the interior of the sleeve, as at 10. The saddle-post 3 is further scarfed, as at 11, opposite to the point 12, creating a curved or arching face upon the end between the lesser points. (Shown in Fig. 6.) The front reach-bar 4 is further cut away by the reëntering angle-notches 13, creating the tongue 14 on the side opposite to the point 15. The edges of the inner ends of said frame-bars are usually suitably beveled, substantially as shown. It will thus be seen that all of said several bars are inserted into sockets which are inclosed within the casing, that they are severally brazed in said sockets or onto said projections by placing the brazing material on the outside of the casing against the tube and melting it there by suitable application of heat to flow it into the joint, whereby the tubes are heated to a much less degree than where the material is melted inside of the tube and with much less damage to the tube, and that the tongue 14 is bent angularly, so as to hook over the intersection of the saddle-post and reach and into the former, substantially as shown. This makes all of said joints flush with the casing and invisible, and also the front reach-bar is reinforced by said hook against longitudinal strains. It will be further seen that the flanges 6 and the outer ends of the sockets operate to hold the casing true to cylindrical form and prevent it from getting out of shape when heated in parts when the tubes are being separately brazed in.

What I claim as my invention, and desire to secure by Letters Patent, is—

In a cycle-frame joint an outer casing provided with openings to receive the frame-bars in combination with a barrel within said casing and supported concentric therewith, and frame-bars inserted through said openings and secured to said barrel, one of said bars being provided with a tongue adapted to be bent over into the end of the adjoining bar.

In witness whereof I have hereunto set my hand this 26th day of September, 1896.

PATRICK BRENNAN.

In presence of—
C. W. SMITH,
HOWARD P. DENISON.